(12) United States Patent
Yang

(10) Patent No.: US 11,663,465 B2
(45) Date of Patent: May 30, 2023

(54) METHOD OF MANAGING TASK PERFORMANCE IN AN ARTIFICIAL NEURAL NETWORK, AND SYSTEM EXECUTING AN ARTIFICIAL NEURAL NETWORK

(71) Applicant: SAMSUNG ELECTRONICS CO., LTD., Suwon-si (KR)

(72) Inventor: Seung-soo Yang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 791 days.

(21) Appl. No.: 16/671,852

(22) Filed: Nov. 1, 2019

(65) Prior Publication Data

US 2020/0143244 A1   May 7, 2020

(30) Foreign Application Priority Data

Nov. 5, 2018 (KR) ........................ 10-2018-0134440

(51) Int. Cl.
*G06F 11/00* (2006.01)
*G06N 3/08* (2023.01)
*G06N 3/04* (2023.01)
*G06F 11/34* (2006.01)

(52) U.S. Cl.
CPC .......... *G06N 3/08* (2013.01); *G06F 11/3452* (2013.01); *G06N 3/04* (2013.01)

(58) Field of Classification Search
CPC .................................................. G06F 11/3452
USPC ....................................................... 714/1–57
See application file for complete search history.

(56) References Cited

U.S. PATENT DOCUMENTS

| 6,874,138 | B1 * | 3/2005 | Ziegler ............... G06F 11/1489 |
| | | | 717/124 |
| 7,117,056 | B2 | 10/2006 | Balic |
| 7,366,564 | B2 | 4/2008 | Szu et al. |
| 9,134,980 | B1 * | 9/2015 | Cabrera .................... G06F 8/41 |
| 9,317,492 | B2 | 4/2016 | Ye et al. |
| 9,336,239 | B1 | 5/2016 | Hoffmann et al. |
| 9,530,082 | B2 | 12/2016 | Abdulkader et al. |
| 9,659,384 | B2 | 5/2017 | Shaji et al. |
| 9,684,851 | B2 | 6/2017 | Abdulkader et al. |
| 9,728,184 | B2 | 8/2017 | Xue et al. |

(Continued)

FOREIGN PATENT DOCUMENTS

| CN | 106646867 A | 5/2017 |
| WO | WO 2016/168219 A1 | 10/2016 |
| WO | WO 2017/165551 A1 | 9/2017 |

*Primary Examiner* — Sarai E Butler
(74) *Attorney, Agent, or Firm* — Lee IP Law, P.C.

(57) ABSTRACT

An artificial neural network system for managing a task to be performed by heterogeneous resources executing an artificial neural network, the artificial neural network system including a model analyzer that receives an artificial neural network model and outputs sub-graph information generated based on the artificial neural network model including at least one of sub-graph, a detector that outputs awareness information about the heterogeneous resources, and a task manager that outputs a first request signal for performing a task with respect to each layer of first resource of the heterogeneous resources based on the sub-graph information and the awareness information, and a second request signal for performing an task with respect to each depth of a second resource of the heterogeneous resources.

15 Claims, 10 Drawing Sheets

(56) References Cited

U.S. PATENT DOCUMENTS

| | | |
|---|---|---|
| 9,842,293 B2 | 12/2017 | Young |
| 2003/0037149 A1* | 2/2003 | Hess ..................... H04L 67/131 |
| | | 709/227 |
| 2003/0187624 A1 | 10/2003 | Balic |
| 2010/0232704 A1* | 9/2010 | Thorn ................. G06F 3/04845 |
| | | 382/298 |
| 2011/0271145 A1* | 11/2011 | Silberstein .......... G06F 11/1443 |
| | | 714/18 |
| 2015/0178140 A1* | 6/2015 | Kimata ............... G06F 11/3452 |
| | | 714/48 |
| 2015/0294219 A1 | 10/2015 | Krizhevsky |
| 2016/0217368 A1 | 7/2016 | Ioffe et al. |
| 2016/0283658 A1 | 9/2016 | Venkataramani et al. |
| 2016/0307095 A1 | 10/2016 | Li et al. |
| 2016/0335119 A1 | 11/2016 | Merrill et al. |
| 2016/0358024 A1 | 12/2016 | Krishnakumar et al. |
| 2017/0068889 A1 | 3/2017 | Fougner et al. |
| 2017/0213149 A1 | 7/2017 | Micks et al. |
| 2017/0223097 A1* | 8/2017 | Zhang ................. H04L 67/1097 |
| 2017/0337918 A1 | 11/2017 | Xue et al. |
| 2017/0372201 A1 | 12/2017 | Gupta et al. |
| 2018/0032869 A1 | 2/2018 | Tabaru et al. |
| 2018/0060724 A1 | 3/2018 | Wang et al. |
| 2018/0088996 A1 | 3/2018 | Rossi et al. |
| 2018/0129911 A1 | 5/2018 | Madabhushi et al. |
| 2018/0349189 A1* | 12/2018 | Rossi ....................... G06F 8/451 |
| 2019/0286972 A1* | 9/2019 | El Husseini ........... G06N 3/063 |
| 2019/0294985 A1* | 9/2019 | Baughman ............. G06N 5/047 |

* cited by examiner

METHOD OF MANAGING TASK PERFORMANCE IN AN ARTIFICIAL NEURAL NETWORK, AND SYSTEM EXECUTING AN ARTIFICIAL NEURAL NETWORK

CROSS-REFERENCE TO RELATED APPLICATION

Korean Patent Application No. 10-2018-0134440, filed on Nov. 5, 2018, in the Korean Intellectual Property Office, and entitled: "Method Of Managing Task In Artificial Neural Network and System Including the Artificial Neural Network System Using the Method," is incorporated by reference herein in its entirety.

BACKGROUND

1. Field

Embodiments relate to a method for managing a task of an artificial neural network and a system including the same, and more particularly, to a method for managing a task to be processed by an artificial neural network driven by a plurality of heterogeneous resources, and a system including the same.

2. Description of the Related Art

An artificial neural network (ANN) refers to a computational architecture that models the biological brain. Deep learning, machine learning, and the like may be implemented based on an artificial neural network. Recently, as the number of tasks to be processed executing an artificial neural network has increased dramatically, there is a need to efficiently perform arithmetic processing executing an artificial neural network.

SUMMARY

According to an embodiment, there is provided a system that manages a task to be performed by heterogeneous resources executing an artificial neural network, the artificial neural network system includes a model analyzer that receives an artificial neural network model and outputs sub-graph information generated based on the artificial neural network model, a detector that outputs awareness information about the heterogeneous resources, and a task manager that outputs a first request signal for performing a task with respect to each layer of a first resource of the heterogeneous resources based on the sub-graph information and the awareness information, and a second request signal for performing a task with respect to each depth of a second resource of the heterogeneous resources.

According to an embodiment, there is provided a method of managing a task to be performed by heterogeneous resources executing an artificial neural network, the method includes receiving an artificial neural network model and outputting sub-graph information generated based on the artificial neural network model, outputting awareness information on the heterogeneous resources, and performing a partitioning operation for a plurality of tasks included in the sub-graph information based on the sub-graph information, and outputting a request signal to process tasks in which the partitioning operation is performed at one or more of the heterogeneous resources based on the awareness information.

According to an embodiment, there is provided a system for managing a task to be performed by a resource executing an artificial neural network, the artificial neural network system includes a model analyzer that receives an artificial neural network model and outputs sub-graph information generated based on the artificial neural network model, and a task manager that partitions a plurality of tasks contained in the sub-graph to perform a task with respect to each depth based on the sub-graph information, provides a request signal to resource that does not support a batch mode to perform the plurality of tasks that are partitioned, and provides the request signal N times wherein N is a number of input data to perform the plurality of tasks.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
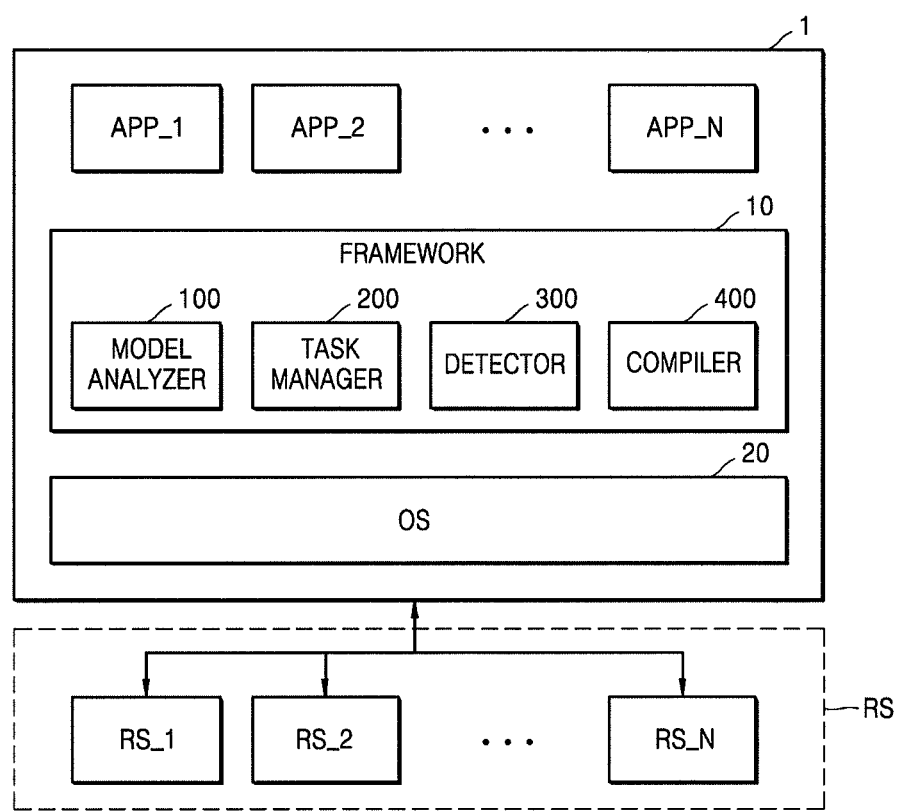
FIG. 1 illustrates an artificial neural network system according to an embodiment.

FIG. 1 illustrates an artificial neural network system according to an embodiment. Referring to FIG. 1, an artificial neural network system 1 may include a plurality of applications APP_1 to APP_N, a framework 10, and an operating system (OS) 20. The artificial neural network system 1 may communicate with one or more resources RS.

According to an embodiment, a plurality of applications APP_1 to APP_N may be generated by various application program interfaces (API) and may perform various tasks executing an artificial neural network model. For example, a plurality of applications APP_1 to APP_N may request a framework 10 to perform data processing executing an artificial neural network model.

According to an embodiment, a plurality of resources RS_1 to RS_N may include heterogeneous resources RS_1 to RS_N, which are different resources, respectively. The plurality of resources RS_1 to RS_N may include computational resources and communication resources.

For example, the computational resources may include various computing devices, e.g., a central processing unit (CPU), a graphic processing unit (GPU), an application processor (AP), a digital signal processor (DSP), a field-programmable gate array (FPGA), a neural network processing unit (NPU), an electronic control unit (ECU), an image signal processor (ISP), and the like. Communication resources may include internal communications, e.g., a system bus, peripheral Component Interconnect (PCI), PCI Express (PCIe), serial advanced technology attachment (SATA), small computer system interface (SCSI), serial attached small computer system interface (SCSI)s (SAS) bus and/or external communications such as a universal serial bus (USB), ethernet, WiFi, bluetooth, near field communication (NFC), radio frequency identification (RFID), mobile telecommunication, and the like.

A computational resource may include a specific task dedicated resource. The specific task dedicated resource may include, e.g., a network processing unit (NPU), a vision processing unit (VPU), and the like. For example, the NPU may be a specific task resource dedicated resource which is used to process tasks executing an artificial neural network model.

The heterogeneous resources RS_1 to RS_N are resources of different kinds, e.g., a first resource RS_1 may be a CPU, a second resource RS_2 may be a GPU, and a N-th resource RS_N may be an NPU.

According to an embodiment, the framework 10 may include a model analyzer 100, a task manager 200, a detector 300, and a compiler 400. Each of the configurations included in the framework 10 may be implemented in software and/or in hardware, e.g., an electronic circuit. For example, the configurations included in the framework 10 may be implemented by a neural network platform, e.g., an evolutionary deep network (EDEN) and/or may be implemented by one or more circuits.

According to an embodiment, a model analyzer 100 may receive data including an artificial neural network model received from the plurality of applications APP_1 to APP_N and may obtain information about the artificial neural network model from the received data. For example, a model parser included in the model analyzer 100 may acquire information about the model.

The model analyzer 100 may acquire information about a model to construct a data structure expressed in a graph structure. For example, a model builder included in the model analyzer 100 may configure the data structure.

The model analyzer 100 may change the data structure represented by the graph structure into a structure suitable for processing by the heterogeneous resources RS_1 to RS_N and may perform a replace, merge and/or split of the data structure. For example, a model optimizer included in the model analyzer 100 may change the data structure.

The model analyzer 100 may transmit the data structure of the graph structure or the data structure of the sub-graph structure to the task manager 200. According to an embodiment, the task manager 200 may generate a plurality of request signals for partitioning and/or distributing tasks to a plurality of heterogeneous resources RS_1 to RS_N. For example, the task manager 200 may generate a first request signal, a second request signal, and a third request signal for performing tasks on a first resource RS_1, a second resource RS_2, and a third resource RS_3, respectively. In this case, a first request signal to a third request signal may be signals requesting to process a task from the first resource RS_1 to the third resource RS_3, respectively.

Specifically, the task manager 200 may generate a first request for processing at least a portion of tasks contained in the data structure in the first resource RS_1, may generate a second request for processing another portion of the tasks contained in the data structure in the second resource RS_2, and may generate a request for processing another portion of the tasks contained in the data structure in the third resource RS_3.

According to an embodiment, the detector 300 may provide various types of awareness information for the task manager 200 to generate a request. For example, the awareness information may include information about a task where each of a plurality of resources RS_1 to RS_N may process information about a task currently being performed, and the like. The information about a task which each of the resources RS_1 to RS_N may process may include the type of task in which each of the resources RS_1 to RS_N may process, the processing time, the capacity that may be processed, and the like. The information about the task currently being executed by each of the resources RS_1 to RS_N may include information, e.g., the type of the task in which each of the resources RS_1 to RS_N is processing, the time required for completion of the current task, the current available capacity, the runtime information, and the like.

Since the detector 300 provides the awareness information to the task manager 200, the task manager 200 may transmit a request signal to a compiler 400 (not shown) or the resources RS_1 to RS_N to allow the task manager 200 to process the most appropriate resource among the plurality of resources RS_1 to RS_N. That is, the task manager 200 may transmit a request signal to the compiler 400 when compiling is required and may transmit a request signal to the resources RS_1 to RS_N when compiling is not required.

The compiler 400 may change a program written in a programming language into a language understood by the resource. For example, when the task manager 200 transmits a request signal for performing a task on a specific resource to the compiler 400, the compiler 400 may compile the task in response to a request signal to allow the compiler 400 to process the task on the specific resource.

According to an embodiment, the compiler 400 may include one or more sub-compilers. Each of the sub-compilers may translate into a language that may be interpreted by each of heterogeneous resources RS_1 to RS_N. For example, the compiler 400 may include a first sub-compiler that may convert into a language that may be interpreted by the first resource RS_1, and a second sub-compiler that may convert into a language that may be interpreted by the second resource RS_2. In other words, the first sub-compiler compiles a task to be able to be processed in the first resource RS_1 in response to receiving a first request signal, and the second sub-compiler compiles a task to be able to be processed in a second resource RS_2 in response to receiving the second request signal.

An operating system (OS) 20 may include various types of mobile operating systems, online operating systems, offline operating systems, and the like, for example, Linux, Linux based Android, Windows, iOS, Mac OS, Chromium OS, and the like.

A memory for storing data processed in the artificial neural network system 1 or the resources RS_1 to RS_N may be included inside or outside the artificial neural network system 1 or each of the heterogeneous resources RS_1 to RS_N. For example, the memory may be one of a volatile memory or a nonvolatile memory. The nonvolatile memory may include a flash memory, a phase-change RAM (PRAM), a magnetic RAM (MRAM), a resistive RAM (RRAM), a ferroelectric RAM (FRAM), and the like. The volatile memory may include a dynamic RAM (DRAM), a static RAM (SRAM), a synchronous DRAM (SDRAM), and the like. In an embodiment, the memory may be one of a hard disk drive (HDD), a solid state drive (SSD), a compact flash (CF), a secure digital (SD), a micro secure digital (SD), extreme digital (xD), a memory stick, and the like. In addition, a direct memory access (DMA) may be included to control access to the memory, and may include, for example, a memory DMA (MDMA), a peripheral DMA (PDMA), a remote DMA (RDMA), a smart DMA (SDMA), and the like.

Figure 2:
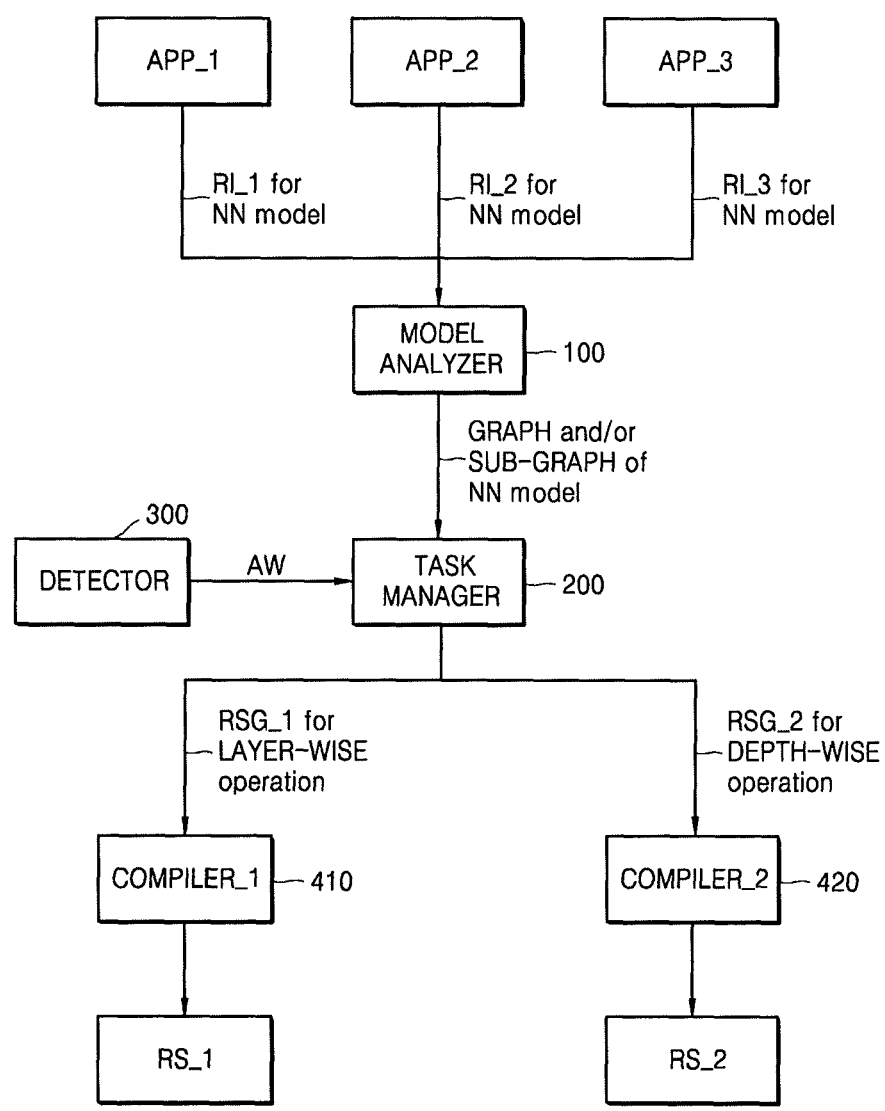
FIG. 2 illustrates a data flow of an artificial neural network system according to an embodiment.

FIG. 2 illustrates a data flow of an artificial neural network system 1 according to an embodiment. In FIG. 2, although three applications APP_1 to APP_3 and two resources RS_1 and RS_2 are illustrated for convenience of explanation any number of applications may be used.

Referring to FIG. 2, each of the applications APP_1 to APP_3 may transmit request information for executing instructions programmed in at least one of the applications APP_1 to APP_3 executing an artificial neural network (ANN) model. For example, the first, second and third applications APP_1 to APP_3 may transmit first, second and third request information RI_1 to RI_3, respectively. A request command transmitted by at least one of the applications APP_1 to APP_3 may include information on the artificial neural network model and/or data on the artificial neural network model.

The model analyzer 100 may receive a request command from at least one of the applications APP_1 to APP_3 to analyze the ANN model. In FIG. 1, as described above, the model analyzer 100 may acquire information about the model, may construct a data structure represented by a graph structure, or may change the structure to a structure suitable for processing by the heterogeneous resources RS_1 to RS_N. For example, the model analyzer 100 may process the artificial neural network model with a data structure having a graph or sub-graph structure suitable for processing by the heterogeneous resources RS_1 to RS_N to provide data about a graph or a sub-graph to the task manager 200. In this case, the graph structure refers to the entire graph structure of the artificial neural network model, and the sub-graph structure refers to a data structure that forms at least a part of the graph structure. For example, FIG. 4 may represent a sub-graph structure that is a part of the entire artificial neural network graph structure. According to an embodiment, when a model analyzer 100 does not need to change the graph structure, the model analyzer 100 may provide information about the data structure of the graph structure to the task manager 200. That is, the model analyzer 100 may provide the graph information or the sub-graph information to the task manager 200.

Meanwhile, the detector 300 may provide awareness information AW to the task manager 200. In FIG. 1, as described above, the awareness information AW may include information about a task that each of a plurality of resources RS_1 to RS_N may process, information about a task currently performed, runtime information, and the like.

The task manager 200 may receive graph information or sub-graph information from the model analyzer 100 and may receive awareness information AW from the detector 300. The task manager 200 may provide a request signal (RSG) requesting to allow the resources RS_1 to RS_N to process a task based on at least one of graph information or sub-graph information and awareness information AW.

According to an embodiment, when the task manager 200 determines that the first resource RS_1 is a resource for processing a task for each layer (e.g., for a layer-wise operation) based on the awareness information AW, the task manager 200 may provide a first request signal RSG_1 to the first resource RS_1 to process a task for each layer. When the task manager 200 determines that the second resource RS_2 may be a resource for processing a task for each depth (e.g., for a depth-wise operation) based on the awareness information AW, the task manager 200 may provide a second request signal RSG_2 to the second resource RS_2 to process the task for each depth.

According to an embodiment, the task manager 200 may provide a request signal (RSG) to the compiler 400. For example, the task manager 200 may transmit a first request signal RSG_1 to a first sub-compiler 410 for the first resource RS_1 and may transmit a second request signal RSG_2 to a second sub-compiler 420 for the second resource RS_2. That is, the task manager 200 may transmit the request signal (RSG) to a sub-compiler required for each resource RS.

As another example, the task manager 200 may provide a request signal (RSG) to the resources RS without passing through the compiler 400. In FIG. 1, as described above, when compiling is not required, a request signal (RSG) corresponding to each of the resources RS_1 to RS_N may be provided. For example, the task manager 200 may directly provide the first request signal RSG_1 to the first resource RS 1 and the second request signal RSG_2 to the second resource RS_2.

According to an embodiment, since the artificial neural network system 1 is configured to allow the resources RS_1 to RS_N to perform tasks in the fastest manner based on graph information or sub-graph information which includes information about the resources RS_1 to RS_N and the awareness information AW, the processing speed of the artificial neural network system 1 and the resources RS_1 to RS_N may be improved.

Figure 3A:
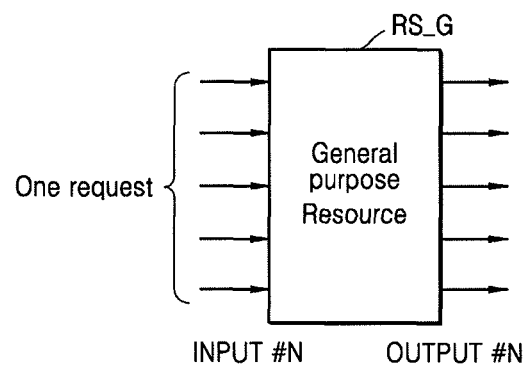
FIG. 3A illustrates a diagram for explaining a general-purpose resource.
Figure 3B:
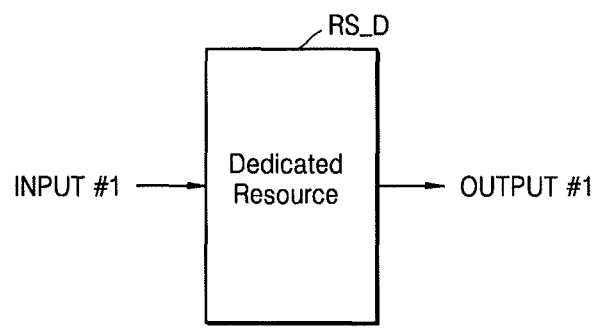
FIG. 3B is a diagram for explaining a specific task-dedicated resource.

FIG. 3A is a diagram for explaining a general purpose resource. FIG. 3B is a diagram for explaining a specific task dedicated resource.

The resources RS_1 to RS_N may include a specific task dedicated resource RS_D and a general purpose resource RS_G. A specific task dedicated resource (RS_D) is a type of computational resource, e.g., a hardware designed to be suitable for processing a specific task. For example, the neural network processing unit (NPU) may be a specific task dedicated resource RS_D to perform computational processing tasks, e.g., convolution task, fully connected task, pooling task, softmax task, and the like, according to the artificial neural network model. In contrast, the general purpose resource RS_G is a resource for performing general task processing and may include a CPU, a GPU, a DSP, and the like.

Referring to FIG. 3A, the general purpose resource RS_G may process a plurality of input data to output a plurality of output data. That is, the general purpose resource RS_G may support a batch mode. In this case, the general-purpose resource RS_G may receive a plurality of input data at the same time and may process the received data in the internal configuration of the general-purpose resource RS_G simultaneously or may process the received data using the time division technique to output a plurality of output data.

Referring to FIG. 3B, the specific task dedicated resource RS_D may not support the batch mode. That is, even though it is desirable to process a plurality of input data in the specific task dedicated resource RS_D, since the specific task dedicated resource RS_D does not receive a plurality of input data, Data input at the same time may be limited to one. Thus, the processing speed is decreased.

According to an embodiment, the artificial neural network system 1 may generate a recursive request signal for a specific task dedicated resource RS_D that does not support a batch mode. This will be described later with reference to FIG. 4.

Figure 4:
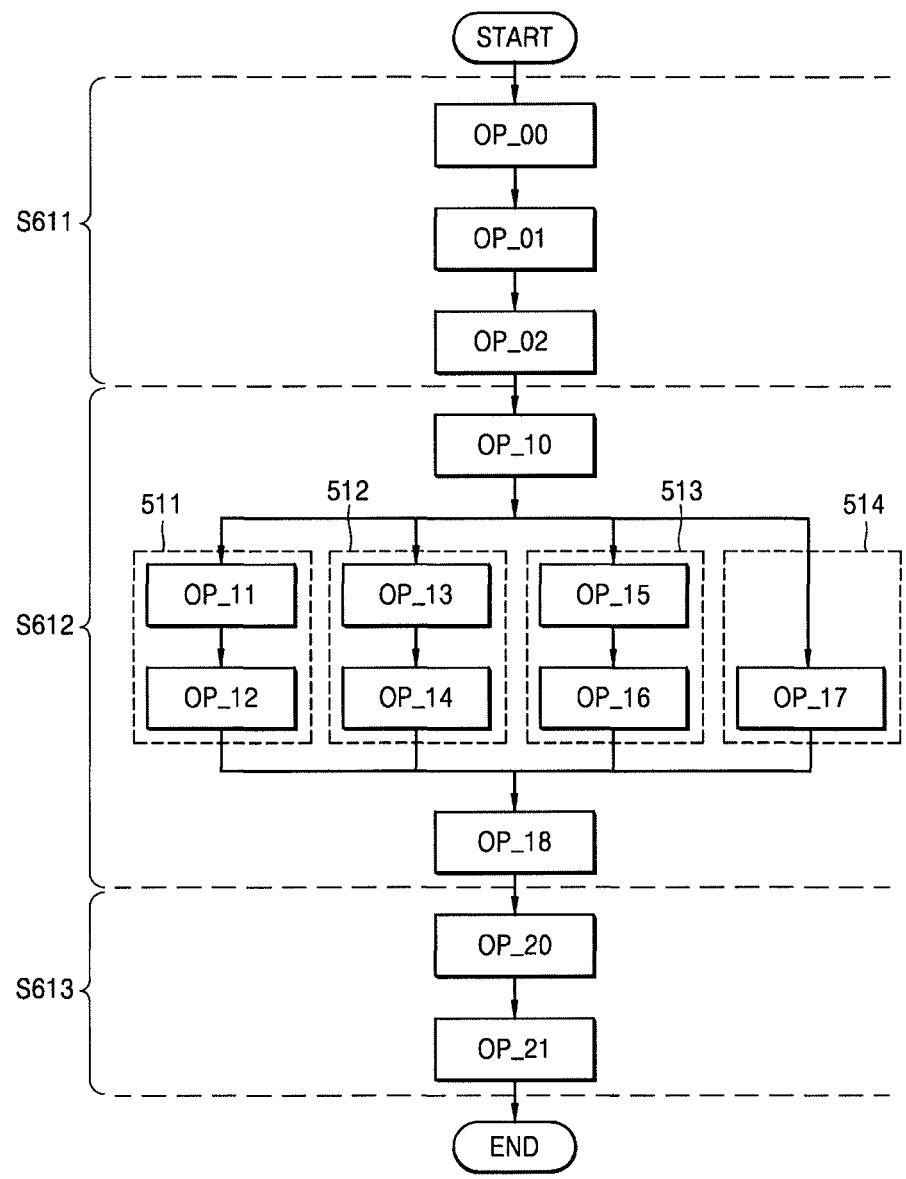
FIG. 4 illustrates a flowchart for explaining a work management method of an artificial neural network system according to an embodiment.

FIG. 4 is a flowchart for explaining a work management method of an artificial neural network system 1 according to an embodiment. Referring to FIG. 4, as a data structure of an artificial neural network model composed of a graph structure, the artificial neural network system 1 may control each resource RS to perform each task (OP) included in the graph structure. The artificial neural network system 1 may partition tasks (OP) into a certain type of work groups 511 to 514. In addition, a plurality of operations S611 to S613 may be performed on the same or different resources RS, respectively.

In processing in the general purpose resource RS_G, the artificial neural network system 1 may provide one request signal (RSG) to the general purpose resource RS_G. As in FIG. 3A, the general purpose resource RS_G may support the batch mode. For example, when there are six image objects to be processed using the artificial neural network model, one request signal (RSG) may be provided to the general purpose resource RS_G, and one request signal (RSG) may include information about six input data (here, an image object).

Figure 5A:
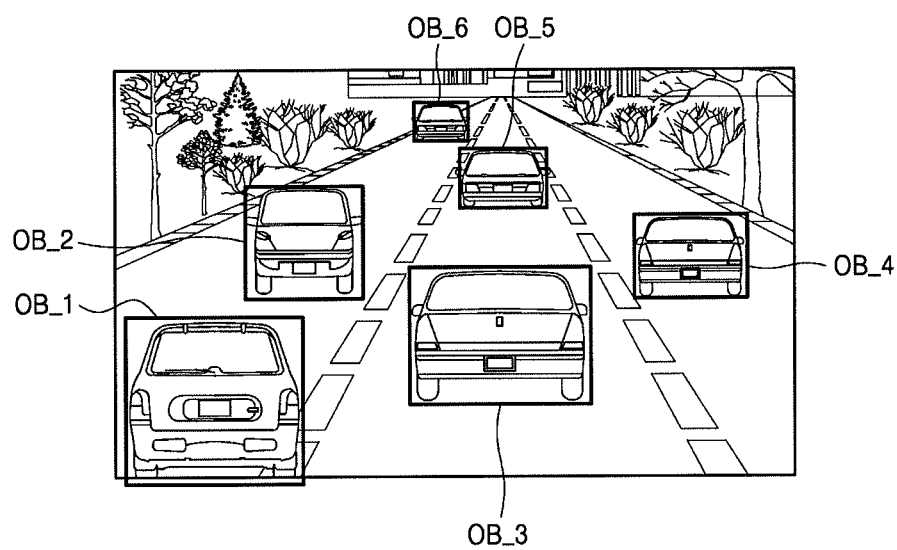
FIGS. 5A and 5B illustrate diagrams for explaining the number of times of transmission of a request signal varied depending on a layout mode according to an embodiment.
Figure 5B:
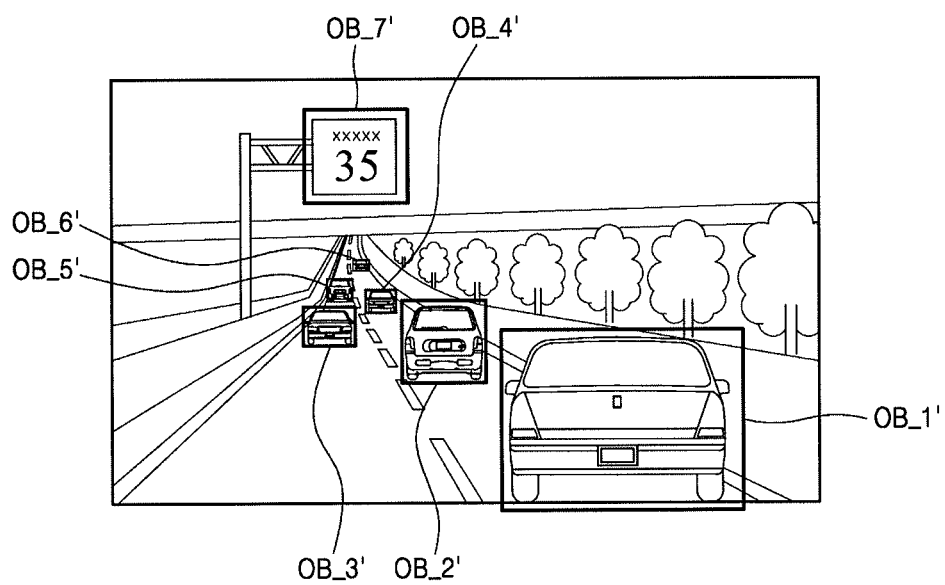

FIGS. 5A and 5B are diagrams for explaining the number of times of transmission of a request signal depending on an arrangement mode according to an embodiment.

In the artificial neural network system 1 according to an embodiment, the number of input data may be changed according to a changing situation. For example, as illustrated in FIGS. 5A and 5B, when the artificial neural network system 1 wants to recognize the foreground objects (OB) photographed by a camera attached to a user's vehicle, as the user's vehicle travels, the number of objects (OB) may vary. For example, an object OB may be identified as a region of interest. In this case, the artificial neural network system 1 may perform a task for recognizing whether or not each object (OB) is a vehicle. Thus, when the number of objects (OB) is determined to be six as illustrated in FIG. 5A, the number of input data is six, and the artificial neural network system 1 may transmit one request signal (RSG) including six pieces of input data to a resource RS (e.g., general purpose resource RS_G) in which the batch mode is supported. However, the artificial neural network system 1 may transmit six request signals (RSG) to a resource RS (e.g., a specific task dedicated resource RS_D) in which the batch mode is not supported.

According to an embodiment, when the number of objects (OB) recognized as illustrated in FIG. 5B increases to seven as a user's vehicle travels, the artificial neural network system 1 may transmit a single request signal RSG including seven objects OB_1' to OB_7' to a resource RS in which a batch mode is supported, e.g., a general purpose resource RS_G. On the other hand, the artificial neural network system 1 may transmit seven request signals (RSG) about each of the seven objects to a resource RS whose batch mode is not supported, e.g., specific task dedicated resource RS_D.

Referring to FIG. 4, according to an embodiment, operation S611 may include tasks OP_00, OP_01, and OP_02 that are not supported by a specific task dedicated resource RS_D, and the artificial neural network system 1 may generate a request signal (RSG) to process some tasks OP_00, OP_01, and OP_02 of the entire tasks (OP) in the general purpose resource RS_G to process the operation S611 in the general purpose resource RS_G. In this case, since the general purpose resource RS_G does not perform a task per depth, the artificial neural network system 1 may provide a request signal (RSG) to the general purpose resource RS_G to perform a task for each layer.

Similarly, operation S613 may include tasks OP_20 and OP_21 not supported by the specific task dedicated resource RS_D, and the artificial neural network system 1 may generate a request signal (RSG) to process some of the tasks OP_20 and OP_21 of the entire tasks (OP) in the general purpose resource RS_G to process the operation S613 in the general purpose resource RS_G.

According to an embodiment, the artificial neural network system 1 may provide a request signal (RSG) according to the result of performing the operation S611 and a request signal (RSG) according to the result of performing the operation S613, which are the same or different from each other, as general purpose resources RS_G. For example, the artificial neural network system 1 may transmit the request signal (RSG) according to the result of operation S611 to a CPU and may transmit a request signal (RSG) according to the result of operation S613 to a CPU or DSP.

According to an embodiment, operation S612 may include tasks OP_11 to OP_17 supported by a specific task dedicated resource RS_D, and the artificial neural network system 1 may generate a request signal (RSG) to process some tasks OP_11 to OP_17 of the entire tasks in the specific task dedicated resource RS_D in operation S612. In this case, since the specific task dedicated resource RS_D performs a task for each depth, the artificial neural network system 1 may provide the request signal RSG to the specific task dedicated resource RS_D to perform a task for each layer or a task for each depth.

The artificial neural network system 1 may provide the request signal (RSG) to a specific task dedicated resource RS_D as many times as the number of input data in the operation of processing in the specific task dedicated resource RS_D. That is, the artificial neural network system 1 may provide a request signal (RSG) N times when the number of input data is N. As illustrated in FIG. 3B, the specific task dedicated resource RS_D may not support the batch mode. For example, when the number of image objects to be processed executing an artificial neural network model is six, six request signals (RSG) may be provided to a specific task dedicated resource RS_D, and each of the six request signals (RSG) may include information about six input data (here, an image object). In this case, the task manager 200 may repeatedly transmit a request signal (RSG) during six times in a recursive loop form to six request signals (RSG).

According to an embodiment, the task manager 200 may determine which resource RS in which each task (OP) is executed based on information about the received neural network model. For example, the task manager 200 may receive sub-graph information from the model analyzer 100 and may analyze a task (OP) contained in the received information to determine a compatible resource RS for the task (OP). For example, a task OP_01 may determine that the task is not performed by the NPU.

According to an embodiment, the artificial neural network system 1 may partition tasks into a plurality of task (or work/task) groups. Specifically, the artificial neural network system 1 may partition tasks OP_11 to OP_17 to be performed in a specific task dedicated resource RS_D into at least one of work groups 511 to 514. The artificial neural network system 1 may partition the tasks OP_11 to OP_17 in the case of at least one operation S612 in which the processing may be performed for each depth among the plurality of operations S611 to S613, to process each of the work groups 511 to 514 in parallel. For example, a work group 511 may include tasks OP_11 and OP_12, a work group 512 may include tasks OP_13 and OP_14, and a work group 513 may include tasks OP_15 and OP_16, and a workgroup 514 may include a task OP_17. That is, the artificial neural network system 1 may generate the work groups 511 to 514 so that work processing may be performed in parallel.

Tasks OP_11, OP_13, and OP_15 may be processed in the same layer of the neural network model. In other words, performing a task for each layer may mean performing tasks OP_12, OP_14, OP_16, and OP_17 processed in the same layer after tasks OP_11, OP_13, and OP_15 processed in the same layer are performed. On the other hand, performing the work for each depth may mean performing the tasks OP_13 and OP_14 placed in the same depth after tasks OP_11, OP_12 placed in the same depth are performed.

Figure 6:
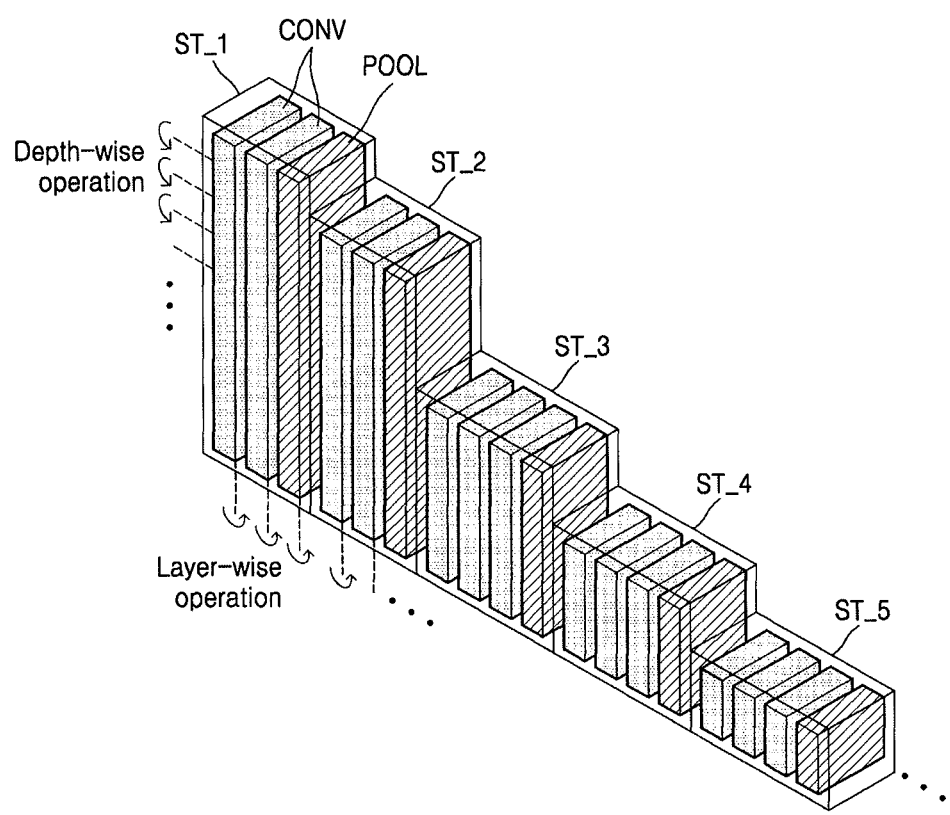
FIG. 6 illustrates a diagram for explaining a method in which a task is processed in an artificial neural network model according to an embodiment.

FIG. 6 is a diagram for explaining a method in which a task is processed in an artificial neural network model according to an embodiment. Referring to FIG. 6, each of a first multi-layer ST_1 and a second multi-layer ST_2 may include three layers, and each of third to fifth multi-layers ST_3 to ST_5 may include four layers. However, the number of multi-layers and layers may be variously provided.

Each of the layers may process various tasks performed in an artificial neural network, such as convolution (CONV), pulley connected, pooling (POOL), softmax, and the like.

According to an embodiment, performing a task on a layer-by-layer basis means that an output of a specific layer is received as an input on a next layer of the specific layer, and the next layer performs an operation. In addition, performing a task for each depth means that a task result of all layers included in a specific depth is processed as an input value for all the layers included in the next depth of the specific depth to perform an task in the next depth.

Meanwhile, referring again to FIG. 4, the task manager 200 according to an embodiment may generate operations or task/work groups based on awareness information AW and sub-graph information. For example, when the available capacity of the CPU is insufficient, in operation S611, the task manager 200 may generate a request signal (RSG) to be processed by a GPU rather than a CPU based on the awareness information AW.

The task manager 200 may generate more or less work groups based on the sub-graph information. For example, the task manager 200 may create three work groups as shown in FIG. 4, but if there are many tasks (OP) in parallel in the graph structure or the sub-graph structure, may create more. In addition, 14 tasks (OP) are illustrated in FIG. 4, for convenience of explanation, and any number of tasks (OP) may be used.

The task manager 200 may generate various numbers of work groups and various numbers of operations. The task manager 200 may generate a request signal (RSG) to dynamically allocate each of the operations to one or more of the heterogeneous resources RS_1 to RS_N.

Figure 7:
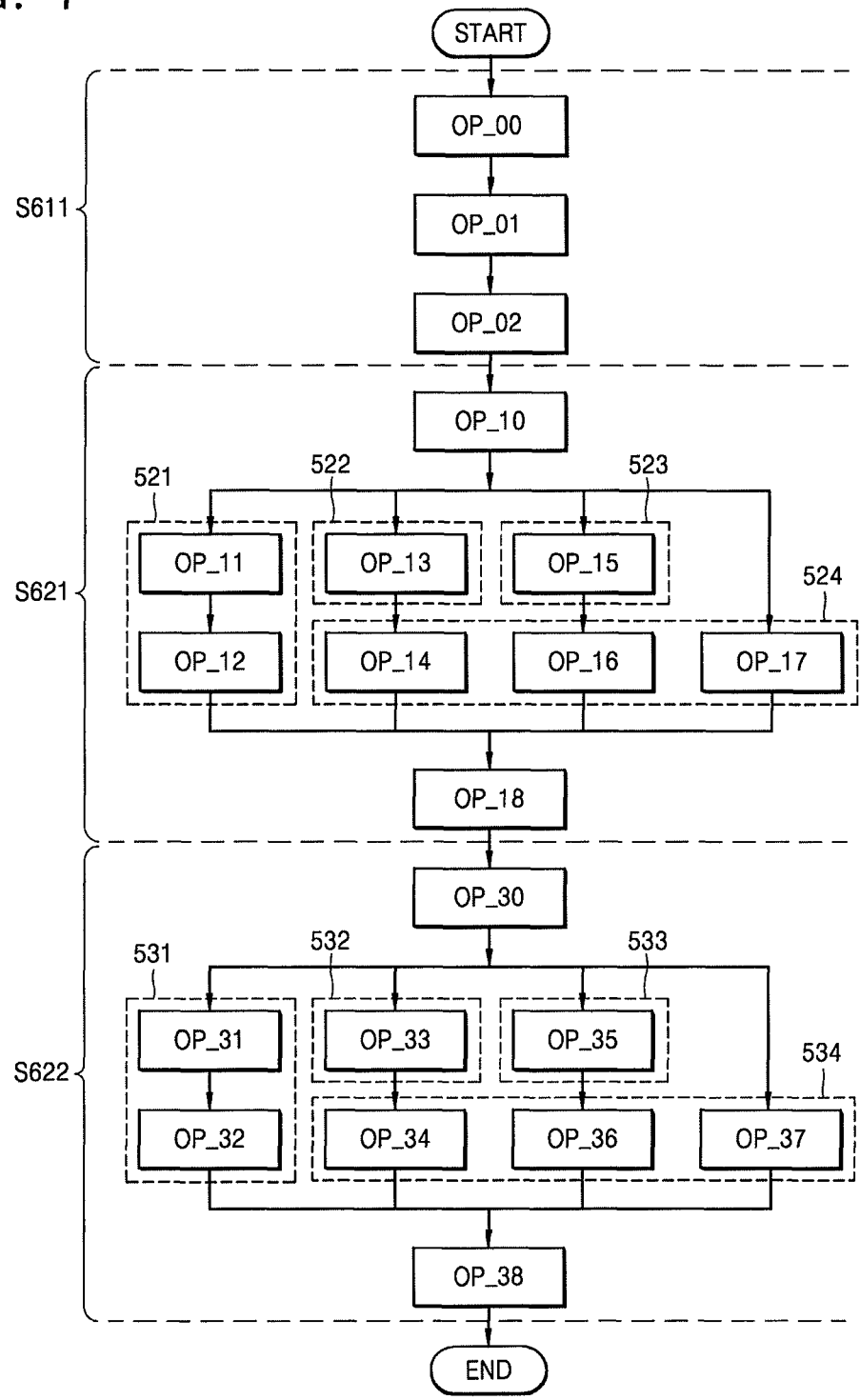
FIG. 7 illustrates a flowchart for explaining a work management method of an artificial neural network system according to an embodiment.

FIG. 7 is a flowchart for explaining a work management method of an artificial neural network system 1 according to an embodiment. Referring to FIG. 7, unlike FIG. 4, the task manager 200 may generate eight work groups 521 to 524 and 531 to 534. In addition, Unlike FIG. 4, the task manager 200 may classify tasks OP_10 to OP_18 into operation S621 and may classify tasks OP_30 to OP_38 into operation S622. The operation S621 may include tasks OP_30 to OP_38 that are performed by a specific task dedicated resource RS_D.

According to an embodiment, in operations S621 and S6222, the task manager 200 may transmit a request signal (RSG) to a specific task dedicated resource RS_D to perform a task for each layer and a task for each depth. That is, the task manager 200 may perform a work for a depth on a work group 521, a work group 522, and a work group 523 during a first time, and may perform a work for a layer from work groups 522 and 523 to a work group 524 during a second time. Thus, the task manager 200 may perform a work for each depth on work groups 521 and 524. This is because a specific task dedicated resource RS_D may perform tasks on a layer-by-layer basis and may also perform tasks on a depth-by-depth basis.

According to an example embodiment, the framework 10 may further include a model keeper, and the task manager 200 may store a request signal for some of the operations in a model keeper. The model keeper may be implemented as the memory described above in FIG. 1. The task manager 200 may receive the sub-graph information from the model analyzer 100 and may determine that at least one of the tasks is equal to each other. For example, the task manager 200 may determine that each of tasks OP_10 to OP_18 and each of tasks OP_30 to OP_38 are the same kind of tasks to each other and an order in which tasks are processed also is the same. In this case, the task manager 200 may reuse a task for generating a request signal in operation S612 without performing a separate task for generating a request signal in operation S621. That is, the task manager 200 may store a request signal for some of the operations. If the task manager 200 determines that an operation of generating the request signal is the same as some of the operations, the task manager 200 may load to output the stored request signal.

According to an embodiment, the task manager 200 may transmit a request signal (RSG) for performing each of the work groups 521 to 524 to one or more of the heterogeneous resources RS_1 to RS_N. For example, the task manager 200 transmits a request signal (RSG) to each NPU so that a work group 521 is allocated to a first NPU, a work group 522 is allocated to a second NPU, and the work group 523 is allocated to a third NPU. The task manager 200 may determine that the specific task dedicated resource RS_D performs work for each layer and/or depth based on the awareness information AW.

In this case, the task manager 200 may determine that the available capacity of the third NPU is sufficient based on the awareness information AW and may assign the work group 524 to one of the resources RS to which the previous layer is assigned. For example, when a third NPU to which a work group 523 is assigned is greater than a second NPU to which a work group 522 is allocated based on the awareness information AW, the task manager 200 may send a request signal (RSG) to the third NPU to process a work group 524. As another example, when the third NPU is occupied by another work group based on the awareness information AW, the task manager 200 may send a request signal (RSG) to process the work group 524 in a second NPU with more available capacity.

According to an embodiment, when there is no more specific task dedicated resource RS_D to process the work group 524, the task manager 200 may send a request signal (RSG) to the general purpose resource RS_G. When the available capacity of all the specific task dedicated resources RS_D communicating with the artificial neural network system 1 is insufficient, a request signal (RSG) may be transmitted to the general purpose resource RS_G. For example, for the work groups 521 to 523, unlike the work group 524, there is no need to process a work group for each depth. Accordingly, the task manager 200 may request the general purpose resource RS_G to process the work groups 521 to 523 by providing a request signal (RSG) to the general purpose resource RS_G.

According to an embodiment, when the input data is N, the task manager 200 may transmit a request signal (RSG) to the specific task dedicated resource RS_D N times. For example, the task manager 200 may determine that the work group 521 is tasks OP_11 and OP_12 to be processed by the first resource RS_1. When extracting a feature or having six regions of interest to be judged as an object of the kind as shown in FIG. 5A, the task manager 200 may transmit a request signal (RSG) to the first resource RS_1 6 times. In this case, the request signal (RSG) transmitted six times may be a request signal (RSG) stored in the model keeper. In addition, the task manager 200 may transmit the same request signal (RSG) to a specific resource RS six times using a recursive statement or a loop function.

Meanwhile, the operation S621 including the above-described tasks OP_10 to OP_18 and the tasks OP_10 to OP_18 may have a graph similar to the operation S622 including the tasks OP_30 to OP_38 and the tasks OP_30 to OP_38, respectively, and thus the above-described embodiment may also be similarly applied.

Figure 8:
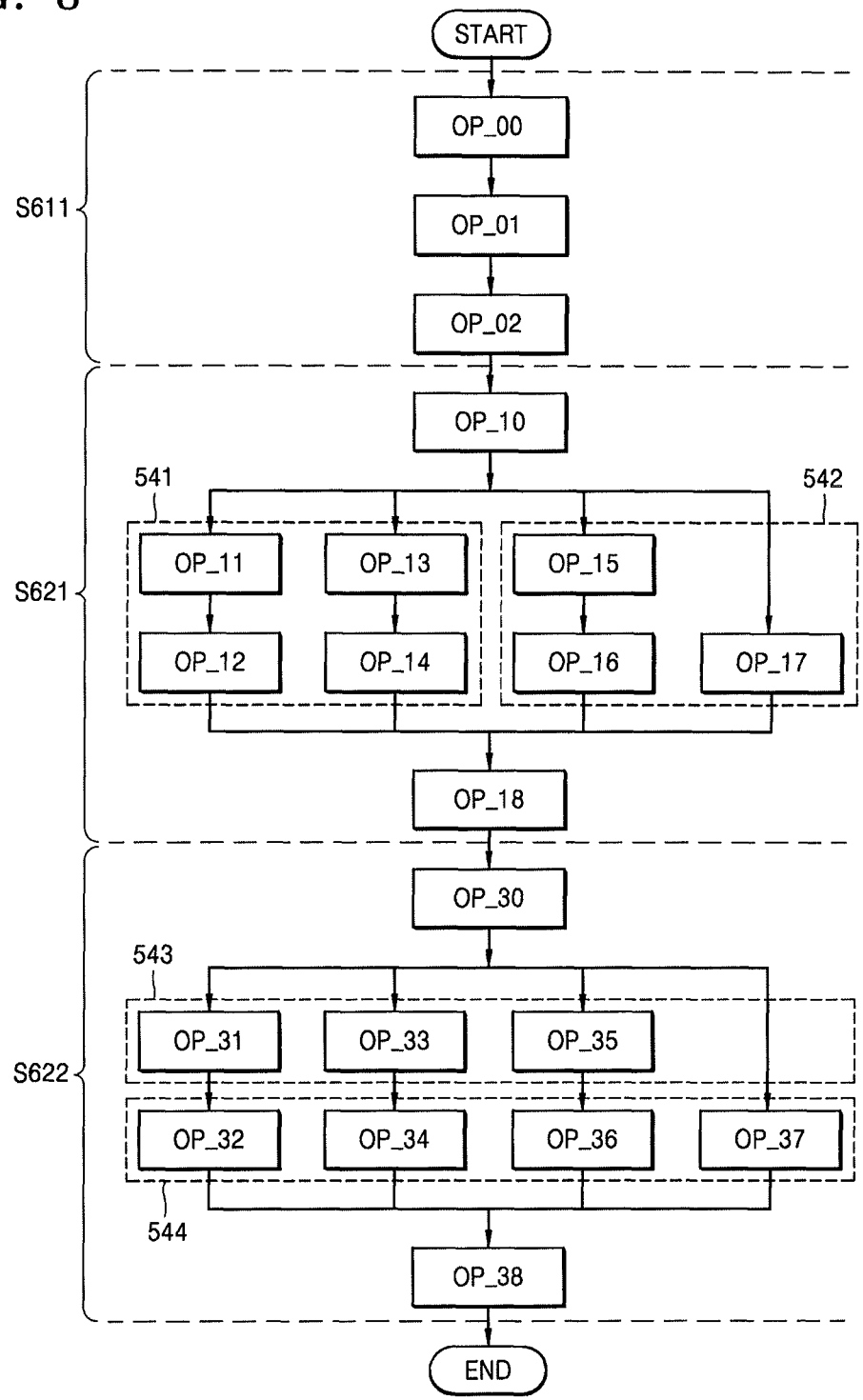
FIG. 8 illustrates a flowchart for explaining a work management method of an artificial neural network system according to an embodiment.

FIG. 8 is a flowchart for explaining a work management method of an artificial neural network system 1 according to an embodiment. Referring to FIG. 8, the task manager 200 receives sub-graph information and may partition work groups in various methods in the same sub-graph structure. For example, the task manager 200 may partition the work groups into two in operation S621. In FIG. 7, the task manager 200 may divide the work groups 521 to 524 into four tasks in operation S621. However, as shown in FIG. 8, the task manager 200 may partition the work groups 541 and 542 into two tasks in operation S621.

According to an embodiment, the task manager 200 may provide a request signal (RSG) to process a partitioned work group 541 in a first NPU and may provide a request signal (RSG) to process a work group 542 in a second NPU. In addition, a task OP_10 and a task OP_18 may be requested to be processed by the first or second NPU, respectively.

According to an embodiment, the task manager 200 may partition the work groups 543, 544 to process all tasks layer by layer, unlike in FIG. 5, at operation S622. The work groups 543 and 544 partitioned for each layer may be distributed to either the general purpose resource RS_G or the specific task dedicated resource RS_D. For example, the task manager 200 may provide a request signal (RSG) to process a work group 543 in a third NPU and may provide a request signal (RSG) to process a work group 544 in a fourth NPU. In other words, the task manager 200 may provide a request signal (RSG) to the specific task dedicated resource RS_D to process a task for each layer.

Figure 9:
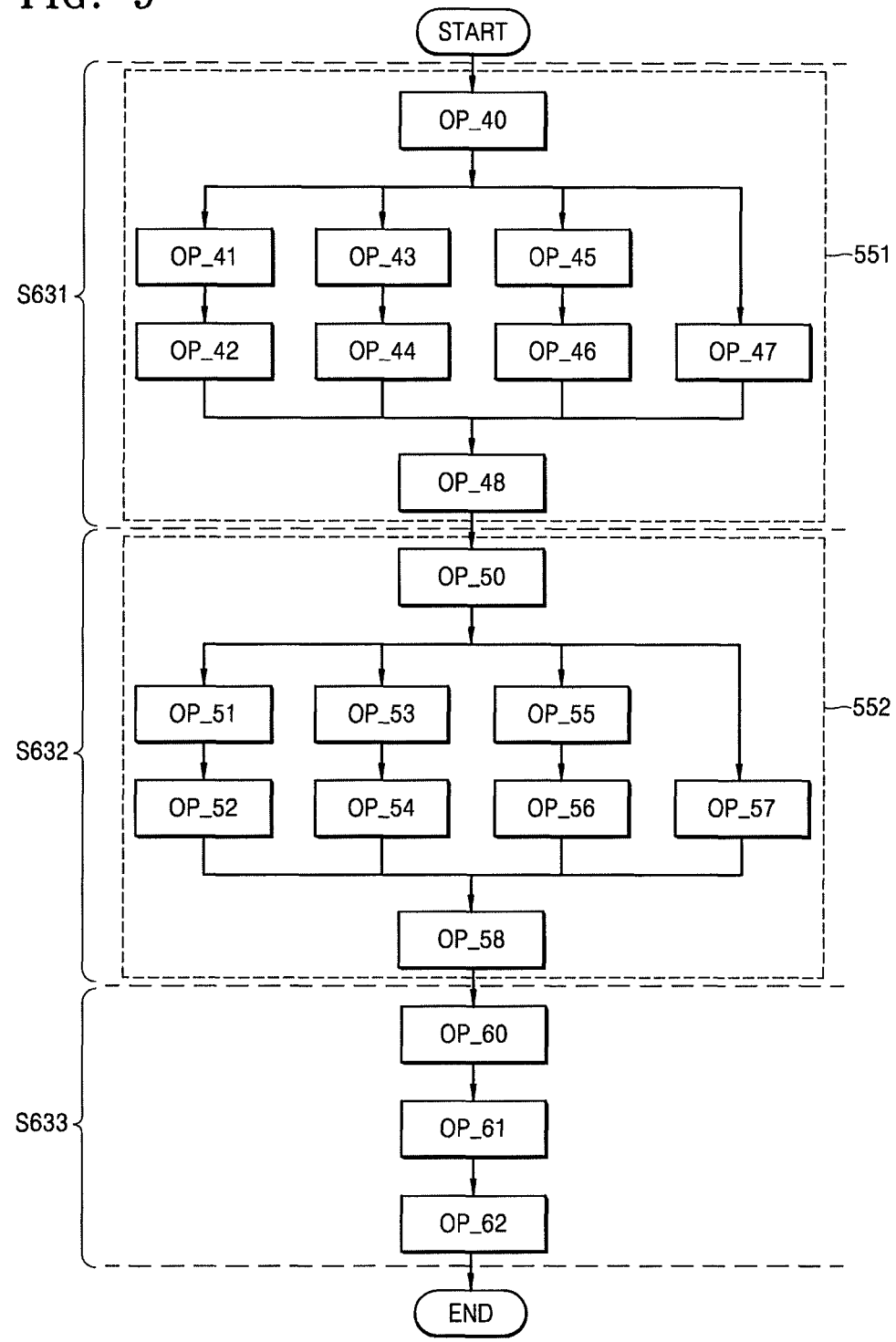
FIG. 9 illustrates a flowchart for explaining a work management method of an artificial neural network system according to an embodiment.

FIG. 9 is a flowchart for explaining a work management method of an artificial neural network system 1 according to an embodiment. Referring to FIG. 9, the task manager 200 may receive the sub-graph information and may provide a request signal (RSG) to process one or more of the heterogeneous resources to process all the tasks OP_40 to OP_48, OP_50 to OP_58, and OP_60 to OP_62 included in the sub-graph information for each layer in each of operations S631 to S633. In addition, the task manager 200 may distribute work groups 551 and 552 to process all the tasks included in the sub-graph on a layer-by-layer basis. For example, the task manager 200 may use a first NPU in operation S631, may use a second NPU in operation S632, and may send a request signal (RSG) to each resource RS for a first CPU to process in operation S633.

In this case, the task manager 200 may provide a request signal (RSG) to process tasks of a particular operation in the same resource RS as a resource RS that processes tasks of an operation adjacent to a specific operation based on the awareness information AW. For example, since the task manager 200 receives the awareness information AW to process a task for processing a fingerprint recognition by a second NPU, the task manager 200 may determine that available capacity of a second NPU is insufficient. According to the determined result, the task manager 200 does not transmit a request signal (RSG) to the second NPU, but may transmit a request signal (RSG) to process a work group 552 of operation S632 on a resource RS that processes operation S631 or operation S633 that are adjacent to operation S632. For example, the task manager 200 may transmit a request signal (RSG) to a first NPU that processes operation S631 or may send a request signal (RSG) to a first CPU that processes operation S633.

According to the above-described embodiment, the task manager 200 may perform tasks on the same resource as an adjacent operation, thereby improving the work efficiency between a plurality of heterogeneous resources RS_1 to RS_N.

Figure 10:
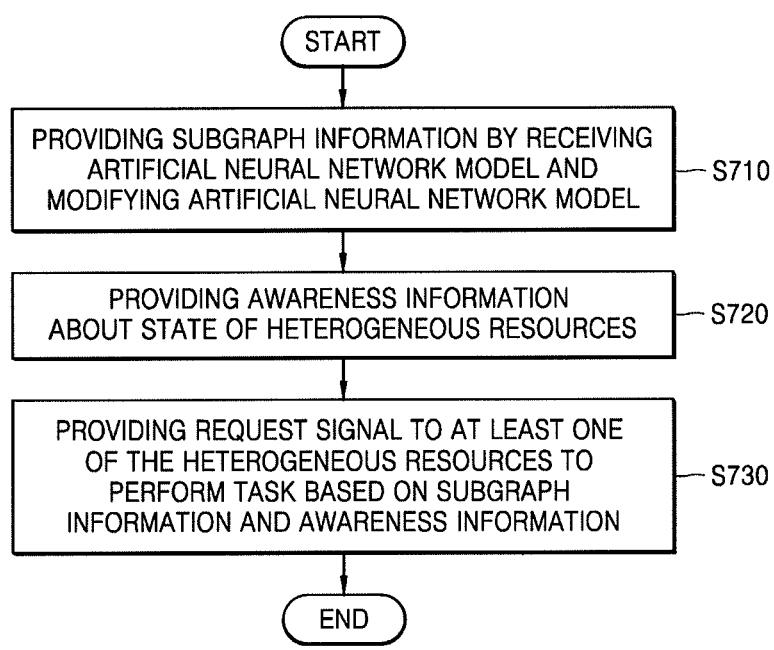
FIG. 10 illustrates a flowchart for explaining a work management method performed by an artificial neural network system according to an embodiment.

FIG. 10 is a flowchart for explaining a work management method performed by an artificial neural network system 1 according to an embodiment.

In operation S710, the work management method may receive an artificial neural network model to provide sub-graph information which modifies the artificial neural network model. In this case, the model analyzer 100 may optimize the graph structure of the artificial neural network into the sub-graph structure by the various methods described above, and may provide sub-graph information about the sub-graph structure. For example, a model parser, a model builder, and a model optimizer included in the model analyzer 100 may provide the sub-graph information as shown in an example for explaining FIG. 1.

In operation S720, awareness information AW related to states of the heterogeneous resources RS_1 to RS_N may be provided. The awareness information AW may include at least one of information about a task that is to be processed by each of the heterogeneous resources RS_1 to RS_N and information about a task that is performed by each of the heterogeneous resources RS_1 to RS_N. For example, the awareness information may include information about a task that may be processed by each of a plurality of resources RS_1 to RS_N, information about a task currently being performed, and the like. The information about a task in which each of the resources RS_1 to RS_N is processed may include, e.g., a type of a task in which each of the resources RS_1 to RS_N may be processed, the processing time of the task, the capacity required, and the like. The information about the task currently being executed by each of the resources RS_1 to RS_N may include information, e.g., the type of the task in which each of the resources RS_1 to RS_N is processing, the time required for completion of the current task, the current available capacity, the runtime information, and the like.

When the task manager 200 determines that one or more of the heterogeneous resources RS_1 to RS_N may not perform the partitioned task based on the received awareness information AW, the task manager 200 may re-partition a plurality of tasks.

In operation S730, a request signal (RSG) may be provided to one or more of the heterogeneous resources RS_1 to RS_N to perform a task based on the sub-graph information and the awareness information AW.

According to an embodiment, in providing a request signal (RSG), the task manager 200 may partition a plurality of tasks contained in the sub-graph based on the sub-graph information, and may provide a different request signal (RSG) to process the partitioned tasks in each of the heterogeneous resources RS_1 to RS_N. In this case, the partitioning may include at least one of a first partitioning for dividing a plurality of tasks for each layer and a second partitioning for dividing by a depth.

According to an embodiment, in providing a request signal (RSG), the task manager 200 may provide a first request signal (RSG) to one or more of the heterogeneous resources RS_1 to RS_N to perform a task for each layer, or may provide a second request signal (RSG) to another one of the heterogeneous resources RS_1 to RS_N to perform a task on a depth-by-depth basis, based on the sub-graph information and the awareness information AW.

According to an embodiment, the task manager 200 may repeatedly provide a request signal (RSG) by the number of input data received, to process a task partitioned for each depth in a specific resource RS. In this case, the specific resource RS may be a resource that does not support a batch mode.

In an example embodiment, according to a method for managing tasks of an artificial neural network driven by a plurality of plurality of heterogeneous resources and a system including the same, the tasks are efficiently distributed to a plurality of heterogeneous resources to increase an operation processing speed.

In an example embodiment, a method of efficiently allocating tasks to resources that perform layer-wise operation processing and resources that perform depth-wise operation processing, thereby increasing an operation processing speed of an electronic system.

In an example embodiment, a dynamic batch mode is also supported for resources that do not support a batch mode, operation processing of resources that does not support the batch mode are efficiently performed.

Embodiments are described, and illustrated in the drawings, in terms of functional blocks, units, modules, and/or methods. Those skilled in the art will appreciate that these blocks, units, modules, and/or methods are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, modules, and/or methods being implemented by microprocessors or similar, they may be programmed using software (e.g., microcode) to perform various functions discussed herein and may optionally be driven by firmware and/or software. Alternatively, each block, unit, module, and/or method may be implemented by dedicated hardware, or as a combination of dedicated hardware to perform some functions and a processor (e.g., one or more programmed microprocessors and associated circuitry) to perform other functions. Also, each block, unit, and/or module of the embodiments may be physically separated into two or more interacting and discrete blocks, units and/or modules without departing from the scope of the disclosure. Further, the blocks, units and/or modules of the embodiments may be physically combined into more complex blocks, units and/or modules without departing from the scope of the disclosure.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A system for executing an artificial neural network, the system comprising a microprocessor programmed by software and a memory element, the microprocessor being configured by the software to implement: a model analyzer that receives an artificial neural network model and outputs sub-graph information, generated based on the artificial neural network model for at least one sub-graph; a detector that outputs awareness information about heterogeneous resources that execute the artificial neural network model, the heterogenous resources including a first resource and a second resource, and the awareness information including a current available capacity of the first resource and a current available capacity of the second resource; and a task manager that receives the sub-graph information and the awareness information, outputs a first request signal for performing a first task layer-wise using the first resource, and outputs a second request signal for performing a second task depth-wise using the second resource; and a compiler, wherein, when the awareness information indicates that the current available capacity of a third resource is insufficient to perform a third task, the task manager provides the first request signal for the first resource to perform the third task at the first resource, and the compiler compiles the third task to allow the first resource to perform the third task after the task manager assigns the third task to the first resource.

2. The system as claimed in claim 1, wherein, in response to the sub-graph information, the task manager partitions a plurality of tasks included in the sub-graph into partitioned tasks, the partitioned tasks including the first task and the second task.

3. The system as claimed in claim 2, wherein the partitioning of the plurality of tasks by the task manager includes at least one of:
   dividing the plurality of tasks with respect to each layer as a plurality of the first tasks, and
   dividing the plurality of tasks with respect to each depth as a plurality of the second tasks.

4. The system as claimed in claim 2, wherein, when at least one of the heterogeneous resources is unable to perform one of the partitioned tasks based on the awareness information, the task manager partitions the plurality of tasks again.

5. The system as claimed in claim 3, wherein the task manager further merges the plurality of the second tasks into the plurality of the first tasks or merges the plurality of the first tasks into the plurality of the second tasks.

6. The system as claimed in claim 1, wherein the awareness information includes at least one of information about a task processable by each of the heterogeneous resources and information about a task which each of the heterogeneous resources is performing.

7. The system as claimed in claim 1, wherein the task manager repeatedly provides the second request signal based on a number of received input data.

8. The system as claimed in claim 7, wherein the number of the received input data includes a number of objects corresponding to a region of interest recognized through vision recognition.

9. The system as claimed in claim 1, wherein:
the compiler includes a first sub-compiler and a second sub-compiler,
the first sub-compiler compiles a task to be able to be processed in the first resource in response to receiving the first request signal, and
the second sub-compiler compiles a task to be able to be processed in the second resource in response to receiving the second request signal.

10. The system as claimed in claim 1, wherein:
each of the first resource and the second resource performs an operation of the artificial neural network including a plurality of layers and depths,
the first resource performs layer-wise processing of an operation using a value output from a first layer as an input value of a second layer, and
the second resource performs depth-wise processing of an operation using an output value of a first depth as an input value of a second depth.

11. The system as claimed in claim 1, wherein:
the first resource is a resource that supports a batch mode in which a plurality of inputs are input at one time,
the second resource is a resource that does not support a batch mode, and
the second resource processes an operation based on the artificial neural network model.

12. A method of managing a task to be performed by heterogeneous resources executing an artificial neural network, the method comprising:
receiving an artificial neural network model, and outputting sub-graph information, generated based on the artificial neural network model;
outputting awareness information on the heterogeneous resources that execute the artificial neural network model, the heterogenous resources including a first resource and a second resource, and the awareness information including a current available capacity of the first resource and a current available capacity of the second resource;
performing a partitioning operation for a plurality of tasks included in the sub-graph information based on the sub-graph information, to provide at least a first task, a second task, and a third task;
based on the sub-graph information and the awareness information, outputting a first request signal for performing the first task layer-wise using the first resource, and outputting a second request signal for performing the second task depth-wise using the second resource; and
when the awareness information indicates that the current available capacity of a third resource is insufficient to perform the third task, providing the first request signal for the first resource to perform the third task at the first resource, and then compiling the third task to allow the first resource to perform the third task after assigning the third task to the first resource.

13. The method as claimed in claim 12, wherein outputting the second request signal includes repeatedly providing the second request signal based on a number of received input data.

14. The method as claimed in claim 12, wherein the partitioning operation includes at least one of:
dividing the plurality of tasks with respect to each layer as a plurality of the first tasks, and
dividing the plurality of tasks with respect to each depth as a plurality of the second tasks.

15. The method as claimed in claim 12, wherein the awareness information includes at least one of information about a task processable by each of the heterogeneous resources and information about a task which each of the heterogeneous resources is performing.

* * * * *